United States Patent Office
3,737,417
Patented June 5, 1973

3,737,417
PROCESS FOR PREPARING AN ALTERNATING COPOLYMER OF AN α-OLEFIN AND A CONJUGATED DIENE
Kiyoshige Hayashi, Tokyo, and Akihiro Kawasaki and Isao Maruyama, Ichihara-shi, Japan, assignors to Maruzen Petrochemical Co., Ltd., Tokyo, Japan
Filed May 5, 1971, Ser. No. 140,552
Claims priority, application Japan, May 7, 1970, 45/38,253; July 24, 1970, 45/64,344, 45/64,345; Nov. 6, 1970, 45/97,130, 45/97,132, 45/97,133
Int. Cl. C08d 1/12, 3/10, 3/04
U.S. Cl. 260—84.1
19 Claims

ABSTRACT OF THE DISCLOSURE

Alternating copolymers of an α-olefin and a $C_5$–$C_{12}$ conjugated diene are formed by reaction in the presence of a catalyst comprising an organoaluminum compound having the formula $AlR_3$ wherein R represents a $C_1$–$C_{12}$ hydrocarbon radical selected from the group consisting of alkyl, cycloalkyl, aryl and aralkyl radicals and an organotitanium compound having

structure in the molecule wherein R is as defined above and X is halogen.

RELATED APPLICATION

This application is related to application Ser. No. 120,405, filed Mar. 23, 1971, wherein alternating copolymers of butadiene and an α-olefin, and a process for preparing the same, are described.

BACKGROUND OF THE INVENTION

(1) Field of the invention

The present invention relates to a process for preparing an alternating copolymer of an α-olefin having the general formula of $CH_2CHR$ wherein R represents a $C_1$–$C_{12}$ hydrocarbon radical selected from the group consisting of alkyl, cycloalkyl, aryl and aralkyl radicals and a $C_5$–$C_{12}$ conjugated diene and a novel alternating copolymer of a $C_5$–$C_{12}$ conjugated diene and said α-olefin.

(2) Description of the prior art

In order to obtain new and useful synthetic elastomers, many attempts have been made to produce alternating copolymer of a conjugated diene and an α-olefin. However, the copolymerization reaction is very difficult and, in general, it is not easy to produce even a random copolymer of conjugated diene and α-olefin by an ionic catalyst.

For example, Belgian Pat. 546,150 reports a process for preparing an amorphous copolymer of butadiene and an α-olefin having more than 3 carbon atoms by using a catalyst system of trialkylaluminum and titanium tetrachloride at 50° C. The copolymer was determined to be amorphous from their X-ray measurements. The chemical configuration of the copolymer is not stereospecific. On the other hand, for example, an alternating copolymer of butadiene and propylene is also shown to be amorphous from its X-ray spectrum at room temperature, but it is a stereospecific copolymer and therefore it can crystallize on stretching or on cooling.

British Pat. 1,026,615 claims a process for preparing a random copolymer of butadiene and propylene by forming a catalyst system of trialkylaluminum and titanium tetrachloride in the presence of propylene, and then adding butadiene to the catalyst system. According to the patent, the propylene content of the copolymer was much higher than that of the copolymer prepared by the catalyst system formed in the absence of propylene. The patent also describes that analysis has shown that the copolymer obtained is a random copolymer and not block copolymer, but there are shown no experimental results which support the assumption.

British Pat. 1,108,630 shows a process for preparing a rubbery random copolymer of butadiene and propylene of high molecular weight with high content of propylene by using a three component catalyst system consisting of trialkylaluminum, iodine and a compound having the general formula of $TiBr_nCl_{4-n}$ wherein n is zero or an integer of 1 to 4. The microstructure of butadiene unit and the content of propylene unit in the copolymer are shown in the patent. But there are shown no experimental results which support the assumption that the copolymer should be a random copolymer of butadiene and propylene. A random copolymer of butadiene and propylene was also prepared by using a catalyst system consisting of triethylaluminum, titanium tetrachloride and polypropylene oxide. Polypropylene oxide was used as a randomizer and a copolymer of butadiene and propylene prepared by the catalyst system of triethylaluminum and titanium tetrachloride was shown to be block type from the results of oxidative decomposition reaction of the copolymer (Paper presented at 2nd Symposium on Polymer Synthesis, Tokyo. Oct. 5, 1968, The Society of Polymer Science, Japan).

At any rate, all of the methods described above relate to the methods for preparing a nonstereospecific or atactic copolymer. On the other hand, an alternating copolymer is stereospecific one and therefore these methods are not pertinent to the process of this invention.

Recently, Furukawa et al. reported a process for preparing an alternating copolymer of butadiene and an α-olefin by using vanadyl (V) chloride-diethylaluminum monochloride-triethylaluminum catalyst system (22nd Annual Meeting of Japan Chemical Society, Tokyo, Mar. 31, 1969; J. Polymer Sci., B7, 671 (1969)).

The methods for preparing an alternating copolymer of butadiene and an α-olefin by using an organoaluminum compound-vanadium (IV) chloride or vanadium (V) oxychloride-organic peroxide or chromium (VI) oxychloride catalyst system (Ger. Offen. 1,963,780), an organoaluminum compound—a vanadium compound having no vanadium-halogen linkage-a halogen compound catalyst system (Ger. Offen. 1,964,706; J. Polymer Science, B7, 613 (1969)) and an organoaluminum compound-a vanadium compound having vanadium-halogen linkage-a compound having M—OR (M is an atom whose electronegativity is less than 2.2 and R is a hydrocarbon radical) linkage catalyst system (Ger. Offen. 2,020,168; Neth. appl. 7,006,067) were all proposed by us previously.

In short, the catalyst systems for alternating copolymerization described above employ an organoaluminum compound and a vanadium compound as indispensable elements of the catalyst systems. The microstructure of butadiene units in the alternating copolymer of butadiene and an α-olefin prepared by these catalyst systems was almost all trans-1,4-configuration, occasionally involving minor amounts of 1,2-configuration.

On the other hand, most recently, we proposed the process for preparing an alternating copolymer of butadiene and an α-olefin by using the three component catalyst system of an organoaluminum compound, titanium tetrahalide and a carbonyl group containing compound (Ger. Offen. 2,023,405, Neth. appl. 7,006,877). The alternating copolymer prepared by this catalyst system contains considerable amounts of cis-1,4-configuration butadiene unit, occasionally involving minor amounts of cis-1,2-configuration and moreover molecular weight of the alternating copolymer is remarkably higher than that of the one prepared by the organoaluminum-vanadium compound type catalyst system described above.

As far as the inventors know, with the exception of the methods described above, there is found to be no prior art in connection with an alternating copolymer of a conjugated diene and an α-olefin nor of a process for the preparation thereof.

SUMMARY OF THE INVENTION

Accordingly, an object of the present invention is to provide a process for preparing an alternating copolymer of a $C_5$–$C_{12}$ conjugated diene and an α-olefin having a high molecular weight in a good yield.

It is a further object of this invention to provide a catalyst system giving high molecular weight alternating copolymer of a $C_5$–$C_{12}$ conjugated diene and an α-olefin in a good yield.

It is a still further object of this invention to provide an alternating copolymer of a $C_5$–$C_{12}$ conjugated diene and an α-olefin having the general formula of $CH_2$=CHR wherein R represents a $C_1$–$C_{12}$ hydrocarbon radical selected from the group consisting of alkyl, cycloalkyl, aryl and aralkyl radicals.

DETAILED DESCRIPTION OF THE INVENTION

Figure 1:
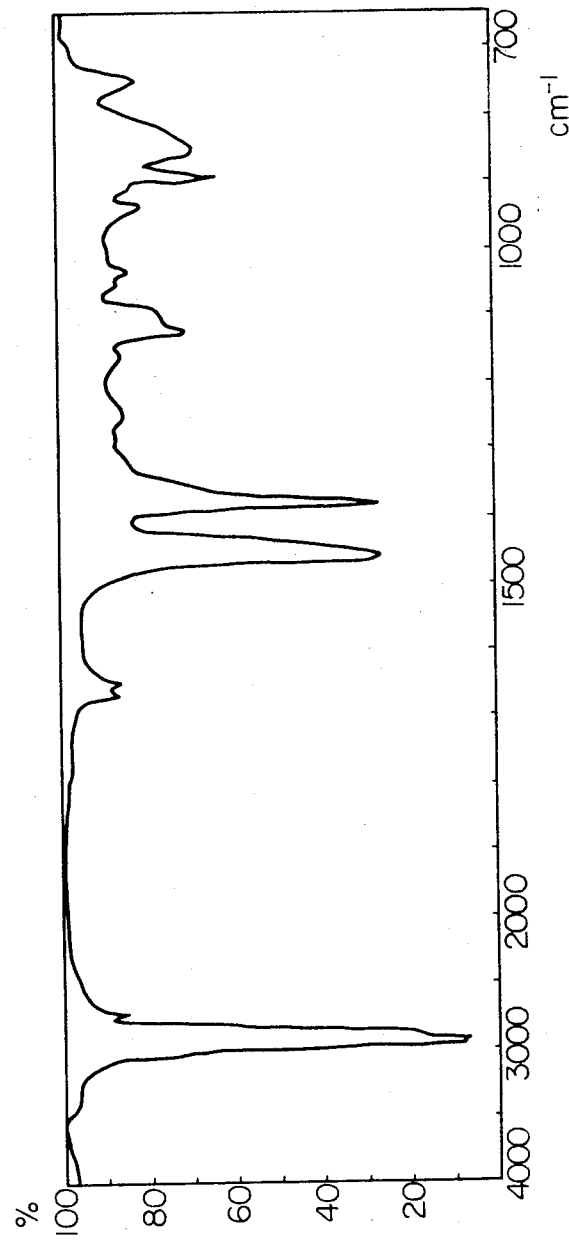
FIG. 1 shows the infra-red spectrum of the typical example of alternating copolymer of isoprene and propylene prepared by the method of this invention.

In accordance with this invention, we have found that a high molecular weight alternating copolymer of a $C_5$–$C_{12}$ conjugated diene and an α-olefin can be produced in a good yield by using a catalyst system comprising of the first component of an organoaluminum compound having the general formula of $AlR_3$ wherein R represents a hydrocarbon radical selected from the group consisting of a $C_1$–$C_{12}$, preferably $C_1$–$C_8$, and more preferably $C_2$–$C_6$, alkyl, cycloalkyl, aryl and aralkyl radicals and the second component of an organotitanium compound having

(R is the same one as described above and X is halogen) structure in the molecule or the catalyst system composed of the first component of an organoaluminum compound having the general formula of $AlR_3$ wherein R is as defined above, the second component of an organotitanium compound having

(R and X are as described above) structure in the molecule and the third component of halogen, a halogen compound or a mixture thereof.

The alternating copolymers of this invention are rubber-like in character and can be used as polymeric plasticizers, in adhesives and can be vulcanized with sulfur or a sulfur compound to produce vulcanized elastomers.

The organoaluminum compounds which form the first component of the catalyst system of this invention are defined by the formula $AlR_3$ wherein R is a hydrocarbon radical selected from the group consisting of a $C_1$–$C_{12}$, preferably $C_1$–$C_8$, and more preferably $C_2$–$C_6$, alkyl, cycloalkyl, aryl and aralkyl radicals. Mixtures of these organoaluminum compounds may also be employed. Specific examples of compounds represented by the formula include trimethylaluminum, triethylaluminum, tri-n-propylaluminum, triisopropylaluminum, tri-n-butylaluminum, triisobutylaluminum, triphentylaluminum, trihexylaluminum, tricyclohexylaluminum, trioctylaluminum, triphenylaluminum, tri-p-tolylaluminum, tribenzylaluminum, ethyldiphenylaluminum, ethyl di-p-tolylaluminum, ethyl dibenzylaluminum, diethylphenylaluminum, diethyl - p-tolylaluminum, diethyl benzylaluminum and the like. Mixtures of these compounds may also be employed. Of these, it is usually preferred to employ trialkylaluminum compounds.

The organotitanium compounds having

(R is a hydrocarbon radical selected from the group consisting of a $C_1$–$C_{12}$, preferably $C_1$–$C_8$, and more preferably $C_1$–$C_6$, alkyl, cycloalkyl, aryl and aralkyl radicals and X is halogen) structure in the molecule and forming the second component of the catalyst system of this invention, by no means limiting, are compounds shown by the general formulae of

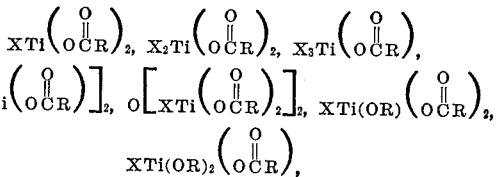

etc. and mixtures thereof.

A mixture of an organotitanium compound having

(R is as defined above) structure and having no Ti—X linkage in the molecule and halogen, a halogen compound or a mixture thereof can be used as the second component of the catalyst of this invention, provided that said organotitanium compound can react with halogen, said halogen compound or the mixture thereof to produce an organotitanium compound having

structure, in situ. Examples of such

structure containing compounds, by no means limiting, are the compounds shown by the general formulae of

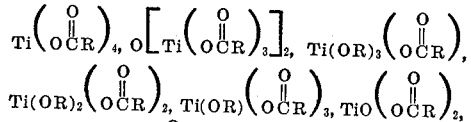

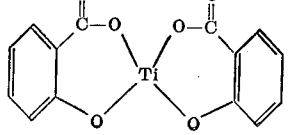

etc. Examples of R radicals employed in the above organotitanium compounds are, by no means limiting, methyl, ethyl, n-propyl, isopropyl, n-butyl, isobutyl, tert-butyl, pentyl, hexyl, cyclohexyl, octyl, phenyl, p-tolyl, benzyl and other radicals.

The halogen compounds which form the third component of the catalyst system of this invention and also used as the halogen source for transforming the compounds having

structure to the second component of the catalyst system, by no means limiting, are the ones showing Lewis acid property such as compounds of the general formulae $VX_4$ (X is halogen hereinafter the same), $VOX_3$, $WX_6$, $MoX_5$, $CrO_2X_2$, $ZrX_4$, $FeX_3$, $BX_3$, $PX_5$, $SnX_4$, $SbX_5$, $AlOX$, $AlX_3$, $CuX$, $MnX_2$, $MgX_2$, $ZnX_2$, $HgX_2$, $BiX_3$, $NiX_2$, $TiX_4$, etc.; Lewis base complex compounds of the above-mentioned halogen compounds showing Lewis acid property such as compounds of the general formulae $AlX_3 \cdot O(C_2H_5)_2$, $BX_3 \cdot O(C_2H_5)_2$, $VOX_3 \cdot O(C_2H_5)_2$, $FeX \cdot O(C_2H_5)_2$, $NiX_2 \cdot Py$ (Py represents pyridine), $HgX_2 \cdot Py$, etc.; organoaluminum compounds having Al—X linkage such as compounds of $Al(OR)_nX_{3-n}$ ($n$ is a number from 1 to 2 and R is as defined above), $AlR_nX_{3-n}$ ($n$ is a number from 1 to 2 and R is as defined above), etc.; organotransition metal compounds having transition metal —X linkage such as compounds of the general formulae $$OV(OR)_nX_{3-n}$$

($n$ is a number from 1 to 2), $Ti(OR)_4X_{4-n}$ ($n$ is a number from 1 to 3), $Zr(OR)_2X_2$, $Zr(OR)_3X$, $OV(C_5H_7O_2)_nX_{3-n}$ ($n$ is a number from 1 to 2), $V(C_5H_5)_nX_{4-n}$ ($n$ is a number from 1 to 2), $V(C_5H_5)_2X$, $OV(C_5H_5)X_2$, $Ti(C_5H_5)_2X$, $Ti(C_5H_5)X_3$, $Ti(C_5H_5)_2X_2$,
$(C_5H_5)Ti(OR)X_2$, $(C_5H_5)_2CrX$, $(C_5H_5)Mo(CO)_3X$, $(C_5H_5)_2IrX_3$, etc.; acid halide; compounds having the general formula of

halogenated alkane compounds such as tert-butyl halide, secbutyl halide, carbon tetrahalide, etc. and a mixture thereof.

The components of the catalyst system are normally employed in catalytic quantities. In the preferred embodiment the molar ratio of organoaluminum compound which forms the first component of the catalyst system of the present invention to organotitanium compound which forms the second component of the catalyst system should be in the range of 200 to 1 (200>Al/Ti>1), the optimum ratios will be found between 100 and 2 (100>Al/Ti>2).

In the preferred embodiment, the atomic ratio of titanium atom in the catalyst system of the present invention to halogen atom in the catalyst system should be in the range of 0.01 to 20 (0.01<Ti/X<20), the optimum ratios will be found between 0.02 and 10 (0.02<Ti/X<10).

The α-olefin used in this invention is one having the general formula:

$$CH_2=CHR$$

wherein R is a hydrocarbon radical selected from the group consisting of a $C_1$–$C_{12}$, preferably $C_1$–$C_8$, and more preferably $C_1$–$C_6$, alkyl, cycloalkyl, aryl and aralkyl radical. Specific examples of compounds represented by the formula include propylene, butene-1, pentene-1, 4-methylpentene-1, hexene-1, 4-methyl-hexene-1, 5-methyl-hexene-1, heptene-1, 5-methyl-heptene-1, octene-1, decene-1, vinylcyclohexane, 4-methyl-1-vinylcyclohexane, styrene and the like. Mixtures of these α-olefin monomers may also be employed.

The conjugated dienes to be used in the present invention have from 5 to 12 carbon atoms, and typical examples are pentadiene-1,3, hexadiene-1,3, isoprene, 2-ethyl butadiene, 2-propyl butadiene, 2-isopropyl butadiene, 2,3-dimethyl butadiene, phenyl butadiene, etc. Among them, isoprene and pentadiene-1,3 are preferable. A mixture of them may also be employed.

The molar ratio of conjugated diene to α-olefin in the initial monomer composition is not critical, but is usually within the range of 10/1 to 1/100 (10/1>diene/α-olefin>1/100), preferably be 10/2 to 1/50 (10/2>diene/α-olefin>1/50). It is noteworthy that, for example, when copolymerization reaction proceeds 50% by using a monomer mixture having the initial monomer composition of 1:50, the molar ratio of unreacted conjugated diene to unreacted α-olefin at this stage should be 1:99.

The manner for preparing the catalyst system of this invention has not been found to be critical. The organoaluminum compound which forms the first component of the catalyst system and the organotitanium compound which forms the second component of the catalyst system or the organoaluminum compound, the organotitanium compound and the halogen or halogen compound which forms the third component of the catalyst system of the present invention can be mixed per se or they can be mixed in the presence of an organic solvent. If a solvent is to be employed, the aromatic solvent such as benzene, toluene, xylene, etc.; the aliphatic hydrocarbon, e.g. propane, butane, pentane, hexane, heptane, cyclohexane, etc.; the halogenated hydrocarbon solvent such as trihaloethane, methylene halide, tetrahaloethylene, etc. are usually preferred.

In general, the organoaluminum compound which forms the first component of the catalyst system and the organotitanium compound which forms the second component of the catalyst system may be mixed at a temperature in the tables given hereinafter. The halogen +100° C., and preferably from −78° C. to +50° C. This temperature is shown as catalyst preparation temperature in the tables given hereinafter. The halogen or halogen compound which forms the third component of the catalyst system may be mixed with the other one or two components of the catalyst system of this invention at a temperature within a very wide range from −100° C. to +100° C., and preferably from −78° C. to +50° C.

The polymerization reaction may be carried out at a temperature within a range from −100° C. to +100° C., and preferably from −78° C. to +50° C.

The practice of this copolymerization is usually carried out in the presence of an organic solvent or diluent. However, this does not mean that this invention cannot be practiced in the form of bulk polymerization, i.e. without the use of solvent. If it is desired to use a solvent, the aromatic solvent such as benzene, toluene, xylene, etc.; the aliphatic hydrocarbon, e.g. propane, butane, pentane, hexane, heptane, cyclohexane, etc.; halogenated hydrocarbon solvent such as trihaloethane, methylene halide, tetrahaloethylene and the like may also be employed.

At the completion of the copolymerization reaction, the product may be precipitated and deashed by using a methanolhydrochloric acid mixture. The precipitated product may be further washed with methanol for several times and dried under vacuum.

As shown in Examples 1, 4 and Experiments 1 and 2 of Example 5 in detail, the products obtained in these examples were determined, through many facts, as the alternating copolymers of isoprene with propylene, hexene-1, pentene-1 and butene-1 respectively. Also, as shown in Examples 6 and 8 in detail, the products obtained in these examples were determined, through many facts, as the alternating copolymers of pentadiene-1,3 with propylene and hexene-1 respectively.

The invention will be illustrated with reference to the following examples.

EXAMPLE 1

The usual, dry, air-free technique was employed and 8.0 milliliters toluene and varying amounts of organotitanium compound were put into 25 milliliter glass bottles at 25° C. Then, the bottles were held in a constant temperature bath showing predetermined temperature (it corresponds to catalyst preparation temperature) and varying amounts of organoaluminum compound solution in toluene (1 molar solution) were put into the bottles respectively. Thereafter, the bottles were held in a low temperature bath at −78° C. and a mixture of 2.0 milliliters liquid propylene and 2.0 milliliters liquid isoprene was put into the each bottle also employing the usual, dry, air-free technique. Then, the bottles were sealed and allowed to copolymerize at predetermined temperature and for predetermined time. The results were summarized in Table 1.

TABLE 1

| Exp. No. | Catalysts | | | | Catalyst preparation temperature (° C.) | Polymerization conditions | | Alternating copolymer of isoprene and propylene | |
|---|---|---|---|---|---|---|---|---|---|
| | Organo-aluminum compound | Mmole | Organotitanium compound | Mmole | | Temp. (° C.) | Time (hr.) | Yield (g.) | Intrinsic viscosity [1] [η] (dl./g.) |
| 1 | Al(i-Bu)$_3$ | 1.0 | TiCl$_3$(OCOCH$_3$) | 0.2 | −40 | −40 | 18 | 0.30 | |
| 2 | Al(i-Bu)$_3$ | 1.0 | TiCl$_2$[OCOCH(CH$_3$)CH$_3$]$_2$ | 0.2 | −40 | −40 | 18 | 0.13 | |
| 3 | Al(i-Bu)$_3$ | 1.0 | TiCl$_3$(OCOC$_6$H$_5$) | 0.5 | −40 | −40 | 18 | 1.40 | |
| 4 | Al(i-Bu)$_3$ | 1.0 | O[TiCl$_2$(OCC$_6$H$_5$)]$_2$ | 0.25 | −40 | −40 | 18 | 0.43 | |
| 5 [2] | AlEt$_3$ | 0.3 | TiCl$_3$OCOC$_6$H$_5$ | 0.1 | −78 | 20 | 145 | 0.97 | 0.40 |

[1] Microstructure of isoprene unit of the alternating copolymer is as follows: 1,2: 0%; 1,4: 90%; 3,4: 10%.
[2] Measured in chloroform at 30° C.

The following results support the conclusion that the copolymer is an alternating copolymer of isoprene and propylene.

(1) In the infra-red spectrum of the copolymer (FIG. 1), there can be seen no peak near 909 cm.$^{-1}$ which corresponds to the band assigned to 1,2-structure of polyisoprene. The 890 cm.$^{-1}$ band is assigned to 3,4-structure of isoprene unit and the broad band at 850 cm.$^{-1}$ is assigned to 1,4-structure of isoprene unit of the copolymer. Therefore, it is concluded that microstructure of isoprene unit of the copolymer is substantially composed of 3,4- and 1,4-structures.

Figure 2:
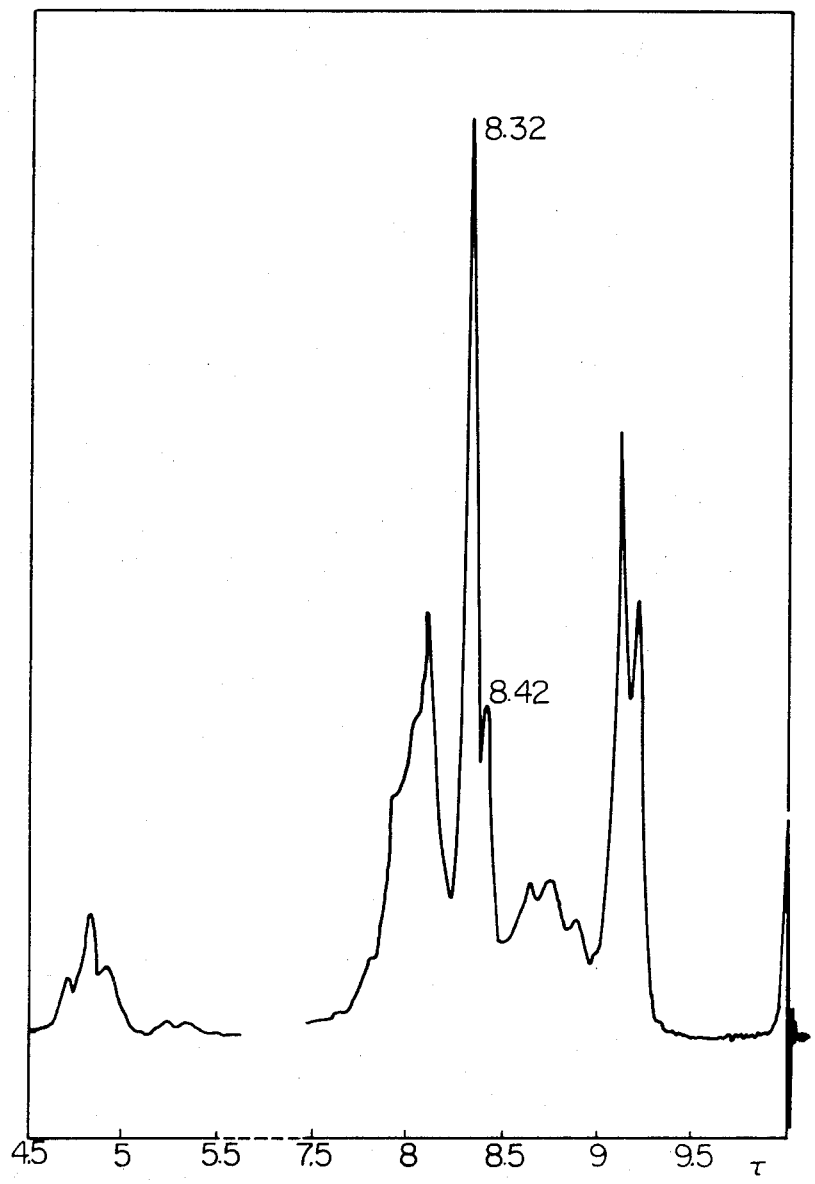
FIG. 2 shows the nuclear magnetic resonance spectrum of the copolymer.

In FIG. 2, the triplet at 4.8τ is ascribed to the proton directly attached to the double bond of 1,4-structure isoprene unit and the weak doublet at 5.3τ is ascribed to isopropenyl methylene group of 3,4-isoprene unit of the copolymer. Measuring the ratio of peak area of the triplet at 4.8τ to half of that of the peak at 5.3τ, the ratio of 1,4-structure to 3,4-structure is found to be 94/6.

(3) Copolymer composition were determined by measuring the ratio of peak area of the triplet at 4.8τ and half of the peak area of the doublet at 5.3τ to one third of the peak area of the doublet at 9.2τ assigned to methyl group of propylene unit of the copolymer. It is found that the composition of the copolymer according to the NMR analysis substantially agrees well with the calculated value for the 1:1 copolymer of isoprene and propylene.

(4) 1,4-polyisoprene shows a peak at 7.95τ which is assigned to methylene group of the polymer. On the other hand, there can be seen substantially no peak at 7.95τ in the NMR spectrum of the copolymer obtained in this example. This means that there are substantially no 1,4-isoprene repeating units in the copolymer. 8.1τ peak may be assigned to methylene group of 1,4-isoprene unit of the alternating copolymer.

(5) The copolymerization reaction gives 1:1 copolymer over a wide range of initial monomer composition.

(6) The copolymerization reaction gives 1:1 copolymer independently of polymerization time.

In FIG. 2, 8.32τ peak may be ascribed to methyl group of cis-1,4-structure of isoprene unit and 8.42τ peak may also be ascribed to the total of methyl groups of trans-1,4- and 3,4-structures of isoprene unit of the copolymer. Therefore, it is concluded that the structure of isoprene unit of the copolymer is mainly cis-1,4-structure.

Figure 11:
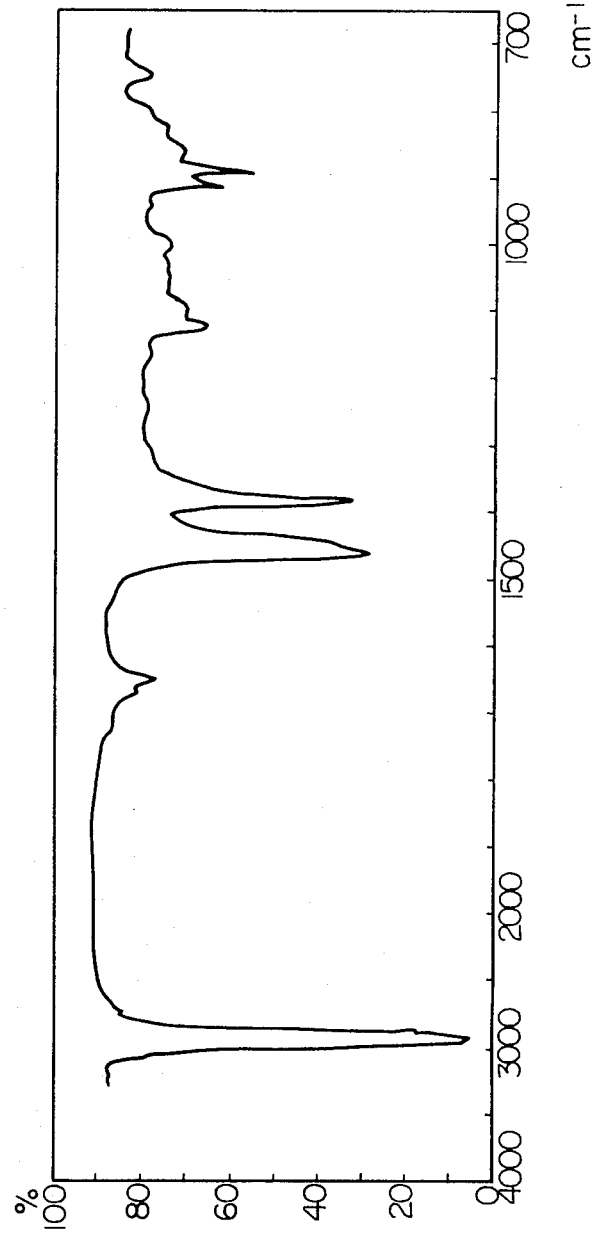
FIG. 11 shows the infra-red spectrum of the alternating copolymer of isoprene and propylene prepared by the catalyst system of triisobutylaluminum, vanadium (V) oxychloride and partial hydrolysis product of aluminum triisopropoxide at —40° C.
Figure 12:
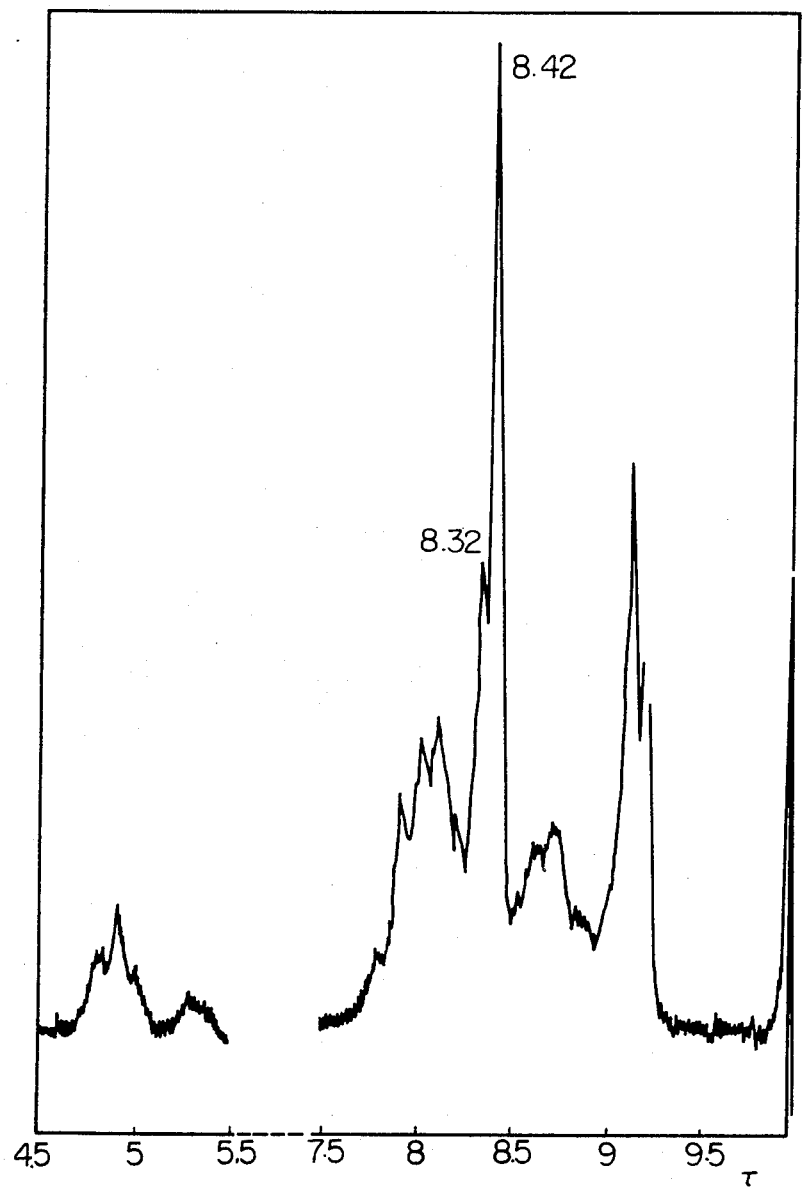
FIG. 12 shows the nuclear magnetic resonance spectrum of the copolymer.

In FIG. 11, in contrast with the spectrum in FIG. 1, a sharp peak appears at 909 cm.$^{-1}$. The band is assigned to 1,2-structure of isoprene unit of the alternating copolymer. The strength of the broad 850 cm.$^{-1}$ band assigned to 1,4-structure of isoprene unit in FIG. 1 is stronger than that of the one in FIG. 11. In FIG. 12, in contrast with the spectrum in FIG. 2, it is found that most of the 1,4-structure units of isoprene is trans-1,4-structure.

From the above results, it is clear that the structure of the alternating copolymer of isoprene and propylene prepared by the method of this invention is quite different from that of the one prepared by an organoaluminum compound-vanadium compound type catalyst system, and therefore, the alternating copolymer of the present invention is a novel material.

From FIGS. 11 and 12, it is also found that microstructure of isoprene unit of the alternating copolymer is as follows:

| | Percent |
|---|---|
| 1,4-structure | 88 |
| 1,2-structure | 5 |
| 3,4-structure | 7 |

The special features of the structure of the alternating copolymer of isoprene and propylene prepared by the method of this invention are as follows:

(a) Microstructure of isoprene unit of the alternating copolymer is composed of large amounts of 1,4-structure and minor amounts of 3,4-structure.

(b) The most part of the 1,4-structure units of isoprene is cis-1,4-structure.

(c) Existence of 1,2-structure unit of isoprene can scarcely be detected by its infra-red spectrum.

EXAMPLE 2

The usual, dry, air-free technique was employed and 8.0 milliliters toluene, varying amounts of organo-titanium compound and varying amounts of halogen compound were put into 25 milliliter glass bottles at 25° C. Then, the bottles were held in a constant temperature bath showing predetermined temperature (it corresponds to catalyst preparation temperature given in Table 2) and varying amounts of triisobutylaluminum solution in toluene (1 molar solution) were put into the bottles respectively. Thereafter, the bottles were held in a low temperature at −78° C. and a mixture of 2.0 milliliters liquid propylene and 2.0 milliliters liquid isoprene was put into each bottle also employing the usual, dry, air-free technique. Then, the bottles were sealed and allowed to copolymerize at predetermined temperature and for predetermined time. The results were summarized in Table 2.

3.0 kg. alternating copolymer prepared under the same polymerization conditions as Exp. No. 4 was vulcanized as follows:

100 parts of copolymer,
50 parts of oil furnace black (H.A.F.),
5 parts of zinc oxide,
1.5 parts of sulphur,
1 part of stearic acid,
1 part of phenyl-β-naphthylamine and
1 part of benzothiazyl disulfide

TABLE 2

| Exp. No. | Catalysts[1] | | | | | Catalyst preparation temperature (° C.) | Polymerization conditions | | Yield of alternating copolymer of isoprene and propylene (g.) |
|---|---|---|---|---|---|---|---|---|---|
| | Al(i-Bu)₃ (mmole) | Organotitanium compound | Mmole | Halogen or halogen compound | Mmole | | Temp. (° C.) | Time (hr.) | |
| 1 | 1.0 | TiCl₃(OCOCH₃) | 0.2 | C₆H₅COCl | 0.1 | −40 | −40 | 18 | 0.48 |
| 2 | 1.0 | TiCl₂[OCCH(CH₃)CH₃]₂ | 0.2 | AlCl₃·OEt₂ | 0.1 | −40 | −40 | 18 | 0.33 |
| 3 | 1.0 | Same as above | 0.2 | tert-BuCl | 0.2 | −40 | −40 | 18 | 0.20 |
| 4 | 1.0 | do | 0.2 | I₂ | 0.1 | −40 | −40 | 18 | 0.16 |
| 5 | 1.0 | O[TiCl₂(OCC₆H₅)]₂ | 0.25 | SnCl₄ | 0.1 | −40 | −40 | 18 | 0.62 |
| 6 | 1.0 | O[Ti(OCCH₃)₃]₂ | 0.1 | SnCl₄ | 0.2 | −40 | −40 | 18 | 0.02 |
| 7 | 1.0 | Same as above | 0.1 | AlEtCl₂ | 0.2 | −40 | −40 | 18 | 0.04 |
| 8 | 1.0 | do | 0.1 | FeCl₃ | 0.1 | −40 | −40 | 18 | 0.02 |
| 9 | 1.0 | Ti(Oi-Pr)₂(OCCH₃)₂ | 0.2 | SbCl₅ | 0.2 | −40 | −40 | 18 | 0.02 |
| 10 | 1.0 | Same as above | 0.2 | VOCl₃ | 0.1 | −40 | −40 | 18 | 1.57 |
| 11 | 0.3 | O[Ti(OCCH₃)₃]₂ | 0.1 | Br₂ | 0.1 | −78 | 20 | 94 | 0.34 |

[1] Ti(Oi-Pr)₂(OCCH₃)₂:Ti(OCH(CH₃)CH₃]₂(OCCH₃)₂.

EXAMPLE 3

The usual, dry, air-free technique was employed and 7.0 milliliters toluene and 0.21 millimole organo-titanium compound were put into 25 milliliter glass bottles at 25° C. Then, the bottles were held in a constant temperature bath showing predetermined temperature (it corresponds to catalyst preparation temperature given in Table 3) and 0.50 milliliter triisobutylaluminum solution in toluene (1 molar solution) were put into the bottles respectively. Thereafter, the bottles were held in a low temperature bath at −78° C. and a mixture of 2.0 milliliters liquid propylene and 2.0 milliliters liquid isoprene was put into each bottle also employing the usual, dry, air-free technique. Then, the bottles were sealed and allowed to copolymerize at predetermined temperature for predetermined time. The results were summarized in Table 3.

were mixed on a roller and vulcanized at 140° C. for 30 minutes. The product obtained by the vulcanization had the following values:

Elongation at break at 25° C. _____percent__ 510
Tensile strength at 25° C. _____kg./cm.²__ 169
Modulus 300% at 250° C. _____kg./cm.²__ 102

EXAMPLE 4

The usual, dry, air-free technique was employed and 7.0 milliliters toluene, 0.1 millimole

and 0.3 milliliter ethylaluminum dichloride solution in toluene (1 molar solution) were put successively into a 25 milliliter glass bottle at 20° C. Then, the bottle was held in a low temperature bath at −78° C. and 10 milli-

TABLE 3

| Exp. No. | Catalysts | | Catalyst preparation temperature (° C.) | Polymerization conditions | | Alternating copolymer of isoprene and propylene | |
|---|---|---|---|---|---|---|---|
| | Al(i-Bu)₃ (mmole) | TiCl₃(OCC₆H₅) (mmole) | | Temperature (° C.) | Time (hr.) | Yield (g.) | Intrinsic viscosity[1] [η] (dl./g.) |
| 1 | 0.50 | 0.21 | −78 | −40 | 16 | 0.24 | 0.50 |
| 2 | 0.50 | 0.21 | −50 | −40 | 16 | 0.29 | 0.80 |
| 3 | 0.50 | 0.21 | −30 | −40 | 16 | 0.47 | 1.00 |
| 4 | 0.50 | 0.21 | −20 | −40 | 16 | 0.54 | 1.30 |
| 5 | 0.50 | 0.21 | 0 | −40 | 16 | 0.51 | 1.32 |
| 6 | 0.50 | 0.21 | 20 | −40 | 16 | 0.06 | |
| 7 | 0.50 | 0.21 | −20 | 20 | 20 | 0.71 | 0.67 |
| 8 | 0.50 | 0.21 | −20 | 0 | 20 | 0.59 | 0.60 |
| 9 | 0.50 | 0.21 | 0 | −20 | 20 | 0.62 | |
| 10 | 0.50 | 0.21 | 0 | 0 | 20 | 0.58 | |

[1] Measured in chloroform at 30° C.

liter triisobutylaluminum solution in toluene (1 molar solution) and a mixture of 3.0 milliliters liquid hexene-1 and 2.0 milliliters liquid isoprene were put successively into the bottle also employing the usual, dry, air-free technique. Thereafter, the bottle was sealed an allowed to copolymerize at —30° C. for 16 hours. The yield of the alternating copolymer of isoprene and hexene-1 was 0.23 g. The microstructure of isoprene unit of the copolymer was as follows: 1,2: 0%; 1,4: 92%; 3,4: 8%.

The following results support the conclusion that the copolymer is an alternating copolymer of isoprene and hexene-1.

Figure 7:
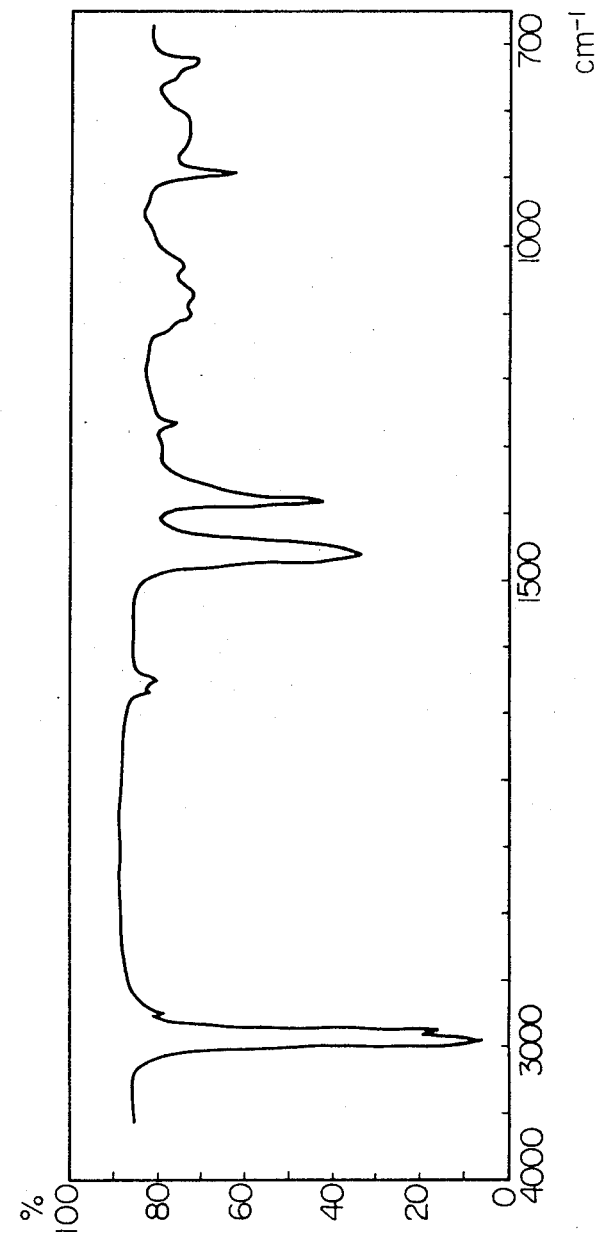
FIG. 7 shows the infra-red spectrum of the typical example of alternating copolymer of isoprene and hexene-1 prepared by the method of this invention.

(1) In the infra-red spectrum of the copolymer (FIG. 7), there can be seen no peak near 909 cm.$^{-1}$. Therefore, it is concluded that microstructure of isoprene unit of the alternating copolymer is substantially composed of 3,4- and 1,4-structures.

Figure 8:
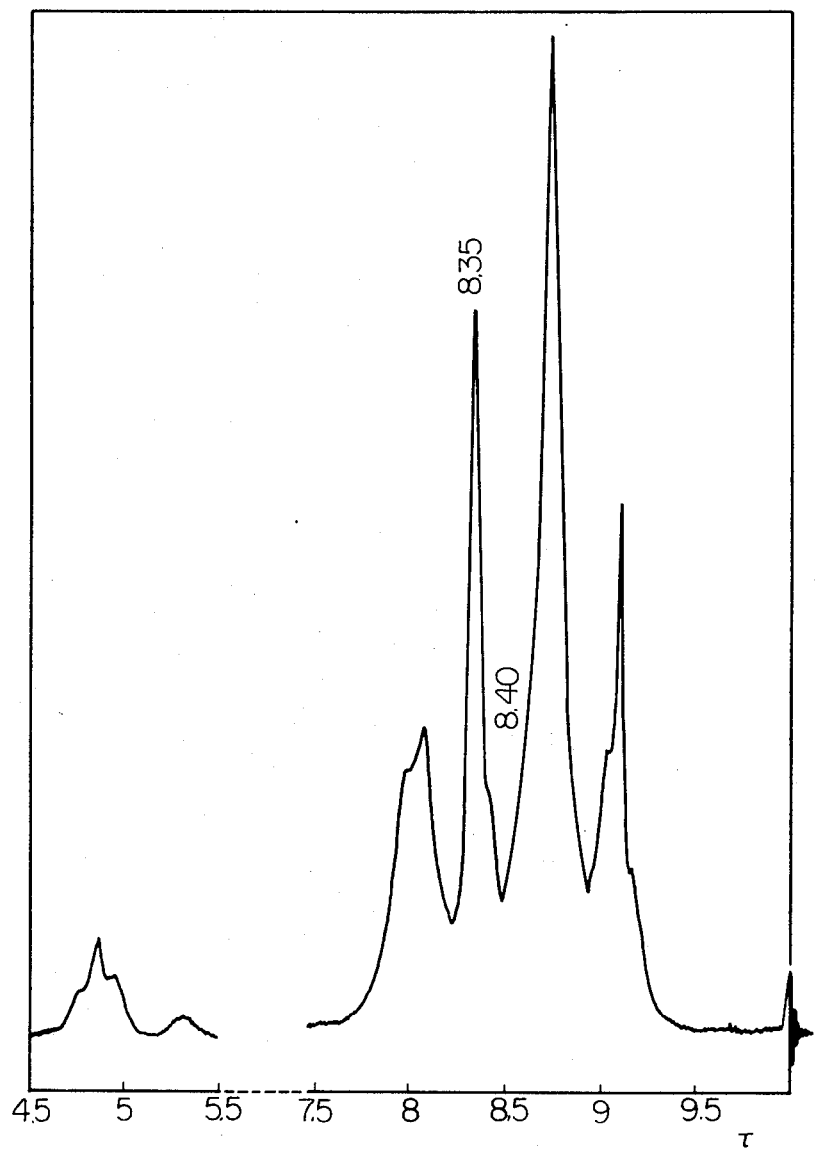
FIG. 8 shows the nuclear magnetic resonance spectrum of the copolymer.

(2) In FIG. 8, measuring the ratio of peak area of the triplet at 4.8τ to half of that of the weak peak at 5.3τ, the ratio of 1,4-structure to 3,4-structure is found to be 90/10.

(3) It is found that the composition of the copolymer according to the NMR analysis substantially agrees well with the calculated value for the 1:1 copolymer of isoprene and hexene-1. The method for measuring the copolymer compositions was applied as was used in the case of alternating copolymer of isoprene and butene-1.

(4) In FIG. 8, there can be seen substantially no peak at 7.95τ corresponding to 1,4-isoprene repeating unit. This means that 1,4-isoprene repeating unit does not appear in the copolymer.

(5) The copolymerization reaction gives 1:1 copolymer over a wide range of initial monomer composition.

(6) The copolymerization reaction gives 1:1 copolymer independently of polymerization time.

In FIG. 8, as in the case of alternating copolymer of isoprene and propylene, by comparing peak area of 8.35τ peak and that of 8.40τ shoulder, it is found that the structure of isoprene unit of the copolymer is mainly cis-1,4-structure.

The alternating copolymer of isoprene and hexene-1 is also found to be a new material.

EXAMPLE 5

The usual, dry, air-free technique was employed and 7.0 milliliters toluene, 0.2 millimole organotitanium compound and 0.5 millimole halogen compound were put successively into 25 milliliter glass bottes at 20° C. Then, the bottles were held in a constant temperature bath showing predetermined temperature (it corresponds to catalyst preparation temperature given in Table 4) and 2.0 milliliters organoaluminum compound solution in toluene (1 molar solution) was put into each bottle. Thereafter, the bottles were held in a low temperature bath at —78° C. and 2.0 milliliters liquid isoprene and 3.0 milliliters liquid α-olefin were put successively into the bottles also employing the usual, dry, air-free technique. Then, the bottles were sealed and allowed to copolymerize at —40° C. for 28.5 hours. The results were summarized in Table 4.

The following results support the conclusion that the copolymer obtained in Experiment 2 of Example 5 is an alternating copolymer of isoprene and butene-1.

Figure 3:
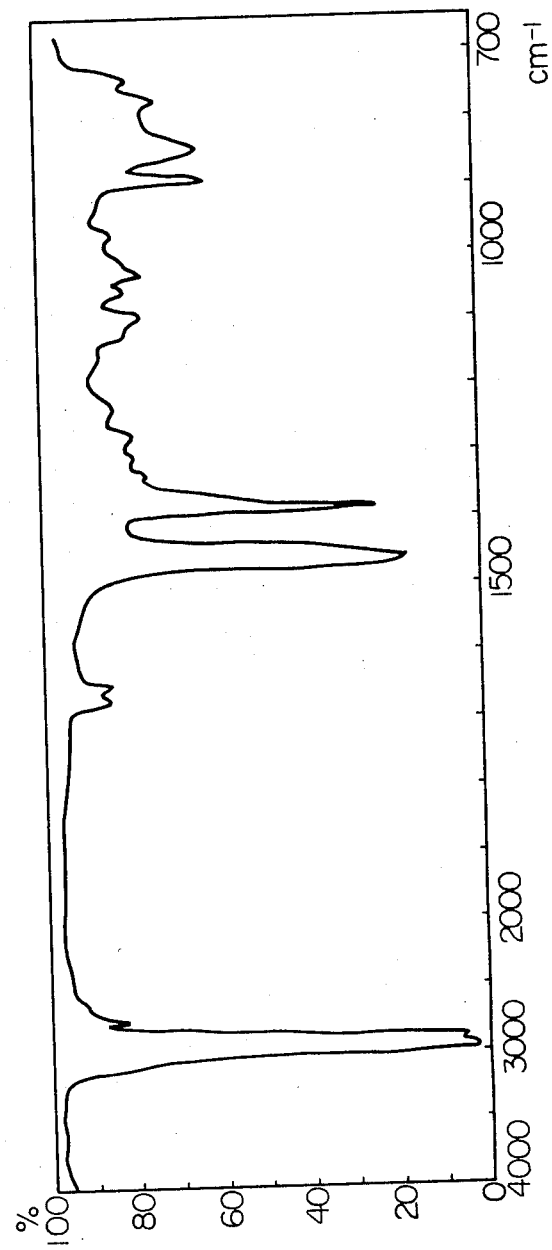
FIG. 3 shows the infra-red spectrum of the typical example of alternating copolymer of isoprene and butene-1 prepared by the method of this invention.

(1) In the infra-red spectrum of the copolymer (FIG. 3), there can be seen no peak near 909 cm.$^{-1}$ which corresponds to the band assigned to 1,2-structure of polyisoprene. The 890 cm.$^{-1}$ and 845 cm.$^{-1}$ bands are assigned to 3,4- and 1,4-structure of isoprene unit of the copolymer, respectively. Therefore, it is concluded that microstructure of isoprene unit of the copolymer is substantially composed of 3,4- and 1,4-structures.

Figure 4:
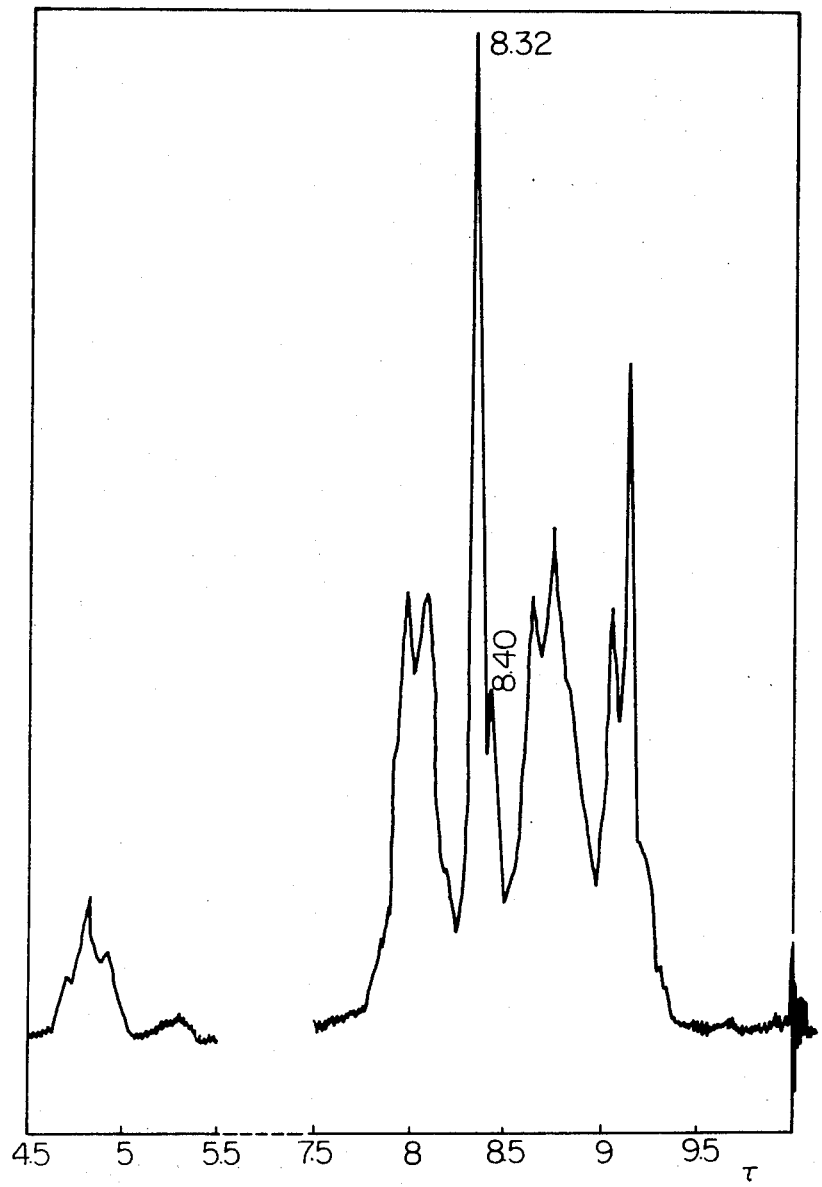
FIG. 4 shows the nuclear magnetic resonance spectrum of the copolymer.

(2) In FIG. 4, the triplet at 4.8τ is ascribed to the proton directly attached to 1,4-isoprene double bond and the weak peak at 5.3τ is ascribed to isopropenyl methylene group of 3,4-isoprene unit of the copolymer. Measuring the ratio of peak area of the triplet at 4.8τ to half of that of the peak at 5.3τ, the ratio of 1,4-structure to 3,4-structure is found to be 93/7.

(3) Copolymer composition were determined as follows:

if A is peak area of the triplet at 4.8τ,
B is peak area of the peak at 5.3τ and
C is peak area of the all peaks appeared in the region from 7.5τ to 9.5τ, the molar ratio of isoprene to butene-1 in the copolymer can be shown by the following equation;

$$\frac{\text{isoprene}}{\text{butene-1}} = \frac{A+\frac{B}{2}}{\{C-(7A+3B)\}\frac{1}{8}}$$

It is found that the composition of the copolymer according to the NMR analysis substantially agrees well with the calculated value for the 1:1 copolymer of isoprene and butene-1.

(4) In FIG. 4, there can be seen substantially no peak at 7.95τ corresponding to 1,4-isoprene repeating unit. This means that 1,4-isoprene repeating unit does not appear in the copolymer.

(5) The copolymerization reaction gives 1:1 copolymer over a wide range of initial monomer composition.

(6) The copolymerization reaction gives 1:1 copolymer independently of polymerization time.

In FIG. 4, as in the case of alternating copolymer of isoprene and propylene, by comparing peak area of 8.32τ peak and that of 8.40τ peak, it is found that the structure of isoprene unit of the copolymer is mainly cis-1,4-structure. As in the case of the alternating copolymer of isoprene and propylene, the alternating copolymer of isoprene and butene-1 of the present invention is a new material.

The following results support the conclusion that the copolymer obtained in Experiment 1 of Example 5 is an alternating copolymer of isoprene and pentene-1.

Figure 5:
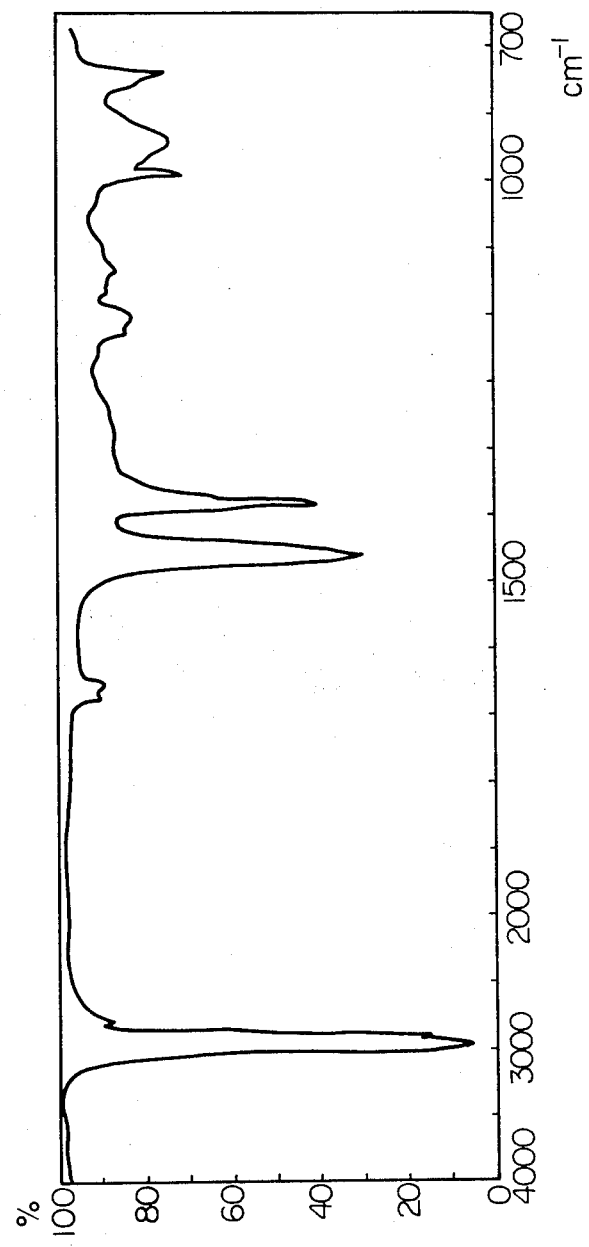
FIG. 5 shows the infra-red spectrum of the typical example of alternating copolymer of isoprene and pentene-1 prepared by the method of this invention.

(1) In the infra-red spectrum of the copolymer (FIG. 5), there can be seen no peak near 909 cm.$^{-1}$. Therefore, it is concluded that microstructure of isoprene unit of

TABLE 4

| Example number | Catalysts | | | | | | Catalyst preparation temperature (° C.) |
|---|---|---|---|---|---|---|---|
| | Organo-aluminum compound | Mmole | Organo-titanium compound | Mmole | Halogen compound | Mmole | |
| 1 | Al(i-Bu)$_3$ | 2.0 | O[Ti(OCEt)$_3$]$_2$ | 0.2 | AlCl$_3$·OEt$_2$ | 0.5 | —40 |
| 2 | AlEt$_3$ | 2.0 | Same as above | 0.2 | AlEtCl$_2$ | 0.5 | —78 |

| Example number | Monomers | | | Polymerization conditions | | | Alternating copolymer of isoprene and α-olefin | | |
|---|---|---|---|---|---|---|---|---|---|
| | | | | | | | | Microstructure of isoprene unit | |
| | Liquid α-olefin | Ml. | Liquid isoprene (ml.) | Temp. (° C.) | Time (hr.) | Yield (g.) | 1,2 (percent) | 1,4 (percent) | 3,4 (percent) |
| 1 | Pentene-1 | 3.0 | 2.0 | —40 | 28.5 | 0.99 | 0 | 94 | 6 |
| 2 | Butene-1 | 3.0 | 2.0 | —40 | 28.5 | 0.19 | 0 | 93 | 7 | the copolymer is substantially composed of 3,4- and 1,4-structures.

Figure 6:
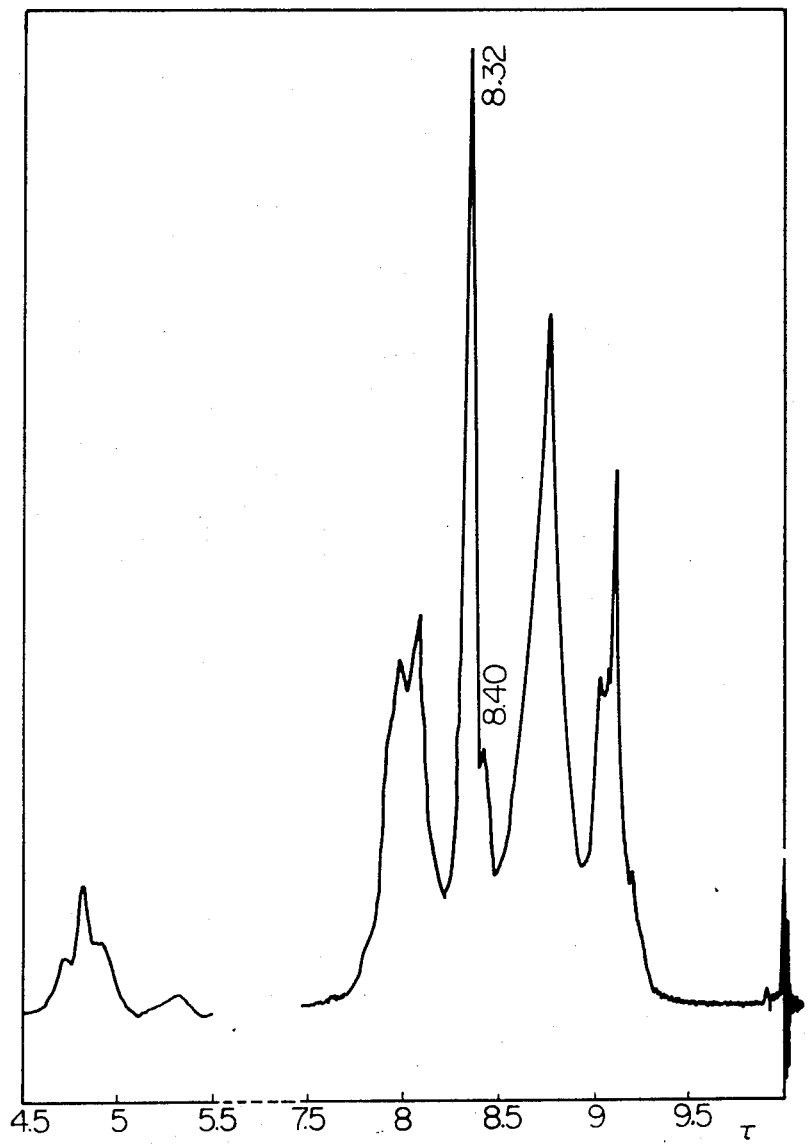
FIG. 6 shows the nuclear magnetic resonance spectrum of the copolymer.

(2) In FIG. 6, measuring the ratio of peak area of the triplet at 4.8τ to half of that of the weak peak at 5.3τ, the ratio of 1,4-structure to 3,4-structure is found to be 94/6.

(3) I is found that the composition of the copolymer according to the NMR analysis substantially agrees well with the calculated value for the 1:1 copolymer of isoprene and pentene-1. The method for measuring the copolymer compositions was applied as was used in the case of alternating copolymer of isoprene and butene-1.

(4) In FIG. 6, there can be seen substantially no peak at 7.85τ corresponding to 1,4-isoprene repeating unit. This means that 1,4-isoprene repeating unit does not appear in the copolymer.

(5) The copolymerization reaction gives 1:1 copolymer over a wide range of initial monomer composition.

(6) The copolymerization reaction gives 1:1 copolymer independently of polymerization time.

In FIG. 6, as in the case of alternating copolymer of isoprene and propylene, by comparing peak area of 8.32τ peak and that of 8.40τ peak, it is found that the structure of isoprene unit of the copolymer is mainly cis-1,4-structure.

The alternating copolymer of isoprene and pentene-1 is also found to be a new material.

EXAMPLE 6

The usual, dry, air-free technique was employed and 2.0 milliliters toluene and varying amounts of organotitanium compound were put into 25 milliliter glass bottles at 25° C. Then, the bottles were held in a low temperature bath at −78° C. (it corresponds to catalyst preparation temperature in Table 5) and 0.6 milliliter organoaluminum compound solution in toluene (1 molar solution) and a mixture of 0.4 milliliter liquid propylene, 0.6 milliliter liquid cis-pentadiene-1,3 and 1.0 milliliter toluene were put successively into the bottles also employing the usual, dry, air-free technique. Thereafter, the bottles were sealed and allowed to copolymerize at −40° C. for 110 hours. The results were summarized in Table 5.

The following results support the conclusion that the copolymer is an alternating copolymer of pentadiene-1,3 and propylene.

(1) In the infra-red spectrum of the pentadiene-propylene copolymer (FIG. 9), it is found that microstructure of pentadiene unit of the copolymer is substantially 1,4-structure.

Figure 10:
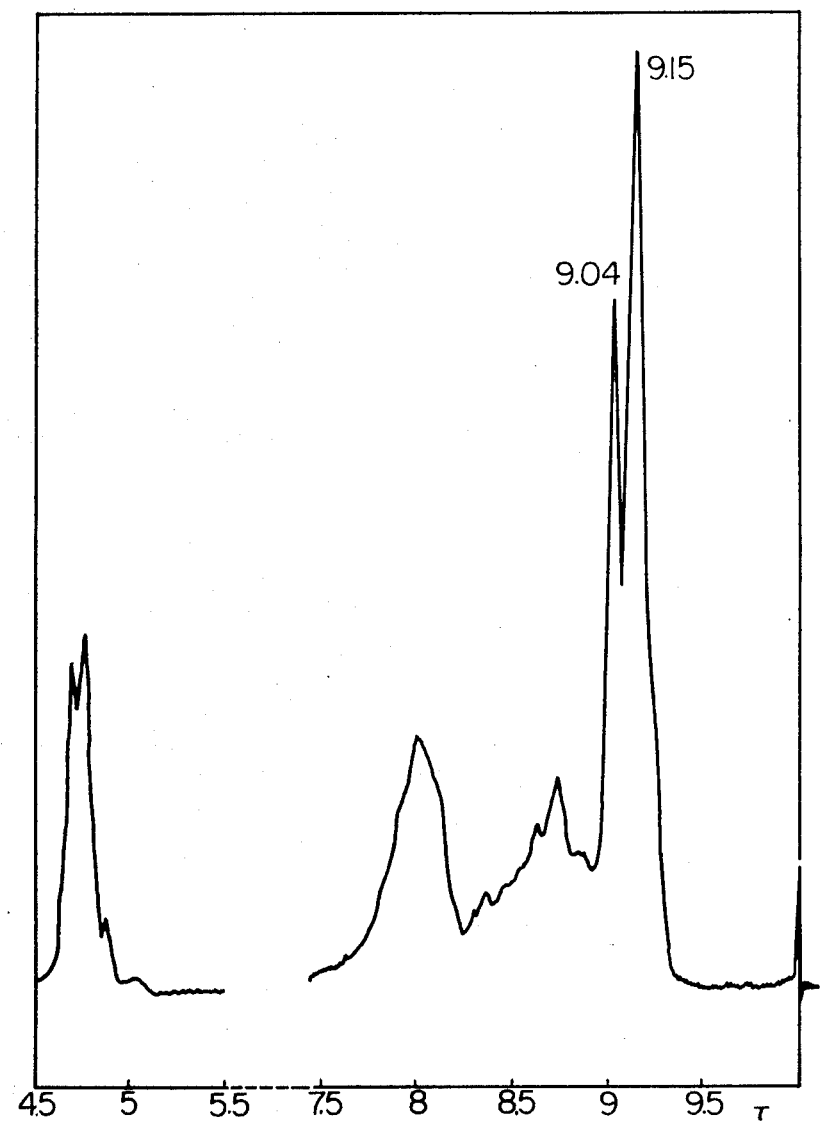
FIG. 10 shows the nuclear magnetic resonance spectrum of the copolymer.

(2) In the NMR spectrume of the copolymer (FIG. 10), the triplet at 4.7τ is ascribed to the protons directly attached to the double bond of pentadiene unit showing 1,4-structure.

(3) Copolymer compositions were determined as follows:

if A is peak area of the triplet at 4.7τ and
C is peak area of the all peaks appeared in the region from 7.5τ to 9.5τ, the molar ratio of pentadiene to propylene in the copolymer can be shown by the following equation;

$$\frac{\text{pentadiene}}{\text{propylene}} = \frac{A/2}{(C-3A)/6} = \frac{3A}{C-3A}$$

It is found that the composition of the copolymer according to the NMR analysis substantially agrees well with the calculated value for the 1:1 copolymer of pentadiene-1,3 and propylene.

(4) The copolymerization reaction gives 1:1 copolymer over a wide range of initial monomer composition.

(5) The copolymerization reaction gives 1:1 copolymer independently of polymerization time.

Figure 9:
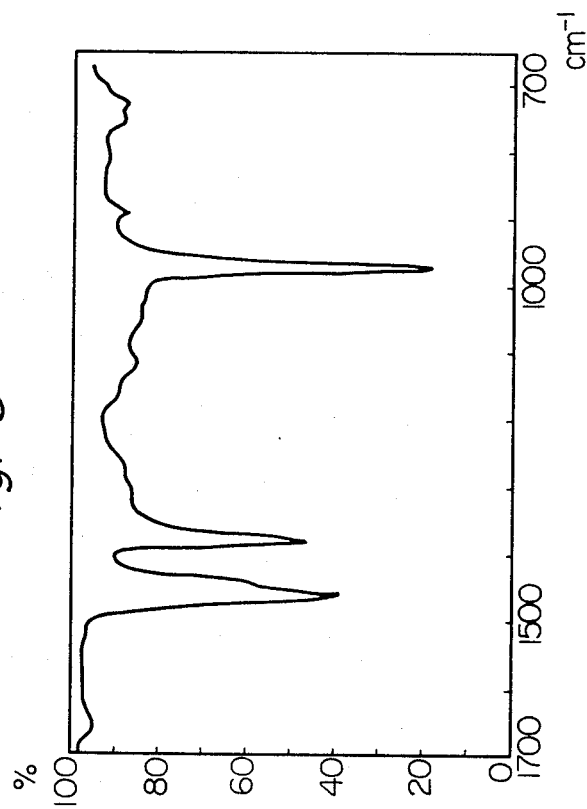
FIG. 9 shows infra-red spectrum of the typical example of alternating copolymer of pentadiene-1,3- and propylene.

(6) Although the greater part of the 1,4-structure units of pentadiene-1,3 is trans-1,4, crystallization sensitive bands of trans-1,4-polypentadiene at 781, 866, 939, 1025 cm.$^{-1}$ scarcely be found in FIG. 9. In the NMR spectrum of amorphous polypropylene, a doublet ascribing to methyl group appears at 9.11τ and 9.21τ. On the other hand, in FIG. 10, the doublet shifts to 9.04τ and 9.15τ. This means that the doublet is ascribed to methyl group of propylene unit of alternating copolymer of pentadiene-1,3 and propylene.

The alternating copolymer of pentadiene-1,3 and propylene could not be prepared by the organoaluminum-vanadium compound type catalyst system.

The alternating copolymer is also considered to be a new material.

The special feature of the structure of alternating copolymer of pentadiene-1,3 and propylene prepared by the process of this invention is as follows:

(a) Microstructure of pentadiene-1,3 unit of the alternating copolymer is 1,4-structure.

(b) The greater part of the 1,4-structure units of pentadiene-1,3 is trans-1,4-structure.

(c) Existence of 1,2-structure unit of pentadiene-1,3 can scarcely be detected by its infra-red spectrum.

TABLE 5

| | Catalysts | | | | Catalyst preparation temperature (° C.) | Polymerization conditions | | Alternating copolymer of pentadiene and α-olefin | | | |
|---|---|---|---|---|---|---|---|---|---|---|---|
| Example number | Organoaluminum compound | Mmol | Organotitanium compound | Mmol | | Temp. (° C.) | Time (hr.) | Yield (g.) | Microstructure of pentadiene unit | | |
| | | | | | | | | | Cis-1,4 (percent) | Trans-1,4 (percent) | 1,2 (percent) |
| 1 | Al(i-Bu)₃ | 0.6 | TiCl₂(OCCH(CH₃)CH₃)₂ with O above C | 0.2 | −78 | −40 | 110 | 0.02 | 8 | 92 | |
| 2 | Al(i-Bu)₃ | 0.6 | TiCl₃OCC₆H₅ with O above C | 0.2 | −78 | −40 | 110 | 0.23 | 9 | 91 | 0 |
| 3 | AlEt₃ | 0.6 | Same as above | 0.2 | −78 | −40 | 110 | 0.15 | 10 | 90 | 0 |
| 4 | Al(i-Bu)₃ | 0.6 | O(TiCl₂OCC₆H₅)₂ with O above C | 0.1 | −78 | −40 | 110 | 0.18 | | | |

EXAMPLE 7

The usual, dry, air-free technique was employed and 2.0 milliliters toluene, 0.2 millimole organotitanium compound and 0.1 millimole halogen compound were put successively into 25 milliliter glass bottles at 25° C. Then, the bottles were left alone at 25° C. for 10 minutes. Thereafter, the bottles were held in a low temperature bath at −78° C. (it corresponds to catalyst preparation temperature) and 0.6 millimole organoaluminum compound solution in toluene (1 molar solution) and a mixture of 0.4 milliliter liquid propylene, 0.6 milliliter liquid cis-pentadiene-1,3 and 1.0 milliliter toluene were put successively into the bottles also employing the usual, dry, air-free technique. Then, the bottles were sealed and allowed to copolymerize at −40° C. for 110 hours. The results were summarized in Table 6.

for 110 hours. The yield of the alternating copolymer of cis-pentadiene-1,3 and hexene-1 soluble in diethyl ether and insoluble in MEK was 0.01 g.

TABLE 6

| Ex. No. | Organo-aluminum compound | Mmol | Organotitanium compound | Mmol | Halogen compound | Mmol | Catalyst preparation temperature (° C.) |
|---|---|---|---|---|---|---|---|
| 1 | Al(i-Bu)$_3$ | 0.6 | TiCl$_2$(OCCH(CH$_3$)CH$_3$)$_2$ (O=C) | 0.2 | AlBr$_3$ | 0.1 | −78 |
| 2 | Al(i-Bu)$_3$ | 0.6 | Same as above | 0.2 | C$_6$H$_5$COCl | 0.1 | −78 |
| 3 | AlEt$_3$ | 0.6 | TiCl$_3$OCCH$_3$ (O=C) | 0.2 | SbCl$_5$ | 0.1 | −78 |
| 4 | Al(i-Bu)$_3$ | 0.6 | O[Ti(OCCH$_3$)$_3$]$_2$ (O=C) | 0.2 | SnCl$_4$ | 0.1 | −78 |
| 5 | Al(i-Bu)$_3$ | 0.6 | Ti(OCH(CH$_3$)CH$_3$)$_2$(OCCH$_3$)$_2$ (O=C) | 0.2 | AlCl$_3$·OEt$_2$ | 0.1 | −78 |

| Example number | Polymerization conditions | | Alternating copolymer of pentadiene and α-olefin | | | |
|---|---|---|---|---|---|---|
| | Temperature (° C.) | Time (hr.) | Yield (g.) | Microstructure of pentadiene | | |
| | | | | Cis-1,4 (percent) | Trans-1,4 (percent) | 1,2 (percent) |
| 1 | −40 | 110 | 0.03 | 11 | 89 | 0 |
| 2 | −40 | 110 | 0.04 | 6 | 94 | 0 |
| 3 | −40 | 110 | 0.05 | | | |
| 4 | −40 | 110 | 0.15 | 7 | 93 | 0 |
| 5 | −40 | 110 | 0.02 | | | |

EXAMPLE 8

The usual, dry, air-free technique was employed and 2.0 milliliters toluene and 0.2 millimole

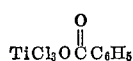

were put into a 25 milliliter glass bottle at 25° C. Then, the bottle was held in a low temperature bath at −78° C. and 0.6 milliliter triisobutyl aluminum solution in toluene (1 molar solution) and a mixture of 0.6 milliliter liquid cis-pentadiene-1,3 0.4 milliliter liquid hexene-1 and 1.0 milliliter toluene were put successively into the bottle also employing the usual, dry, air-free technique. Thereafter, the bottle was sealed and allowed to copolymerize at −40° C. for 110 hours. The copolymer thus obtained was determined as an alternating copolymer of cis-pentadiene-1,3 and hexene-1 by many facts, such as IR spectrum and NMR spectrum thereof. The yield of the alternating copolymer of cis-pentadiene-1,3 and hexene-1 soluble in diethyl ether and insoluble in MEK was 0.02 g.

EXAMPLE 9

The usual, dry, air-free technique was employed and 2.0 milliliters toluene, 0.2 millimole

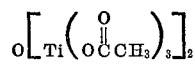

and 0.1 millimole stannic chloride were put successively into a 25 milliliter glass bottle at 25° C. Then, the bottle was left alone at 25° C. for 10 minutes. Thereafter, the bottle was held in a low temperature bath at −78° C. and 0.6 milliliter triisobutylaluminum solution in toluene (1 molar solution) and a mixture of 0.6 milliliter liquid cis-pentadiene-1,3, 0.7 milliliter liquid hexene-1 and 1.0 milliliter toluene were put successively into the bottle also employing the usual, dry, air-free technique. Then, the bottle was sealed and allowed to copolymerize at −40° C.

EXAMPLE 10

The usual, dry, air-free technique was employed and 7.0 milliliters toluene, 0.2 millimole

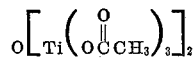

and 0.2 millimole AlCl$_3$·OEt$_2$ were put successively into a 25 milliliter glass bottle at 20° C. Then, the bottle was held in a low temperature bath at −78° C. and 1.0 milliliter triisobutylaluminum solution in toluene (1 molar solution) and a mixture of 1.0 milliliter liquid cis-pentadiene-1,3 and 1.0 milliliter propylene were put successively into the bottle also employing the usual, dry, air-free technique. Thereafter, the bottle was sealed and allowed to copolymerize at 40° C. for 24 hours. The yield of the alternating copolymer was 0.20 g. The microstructure of pentadiene unit of the copolymer is as follows: Cis-1,4: 20%; 1,4: 80%.

What is claimed is:

1. A process for preparing a 1:1 copolymer of a C$_5$–C$_{12}$ conjugated diene and an α-olefin having alternating said conjugated diene and said α-olefin units, said α-olefin having the general formula of CH$_2$=CHR wherein R represents a C$_1$–C$_{12}$ hydrocarbon radical selected from the group consisting of an alkyl, a cycloalkyl, an aryl and an aralkyl radical, which comprises contacting said conjugated diene and said α-olefin in liquid phase with a catalyst composed of (A) an organoaluminum compound having the general formula of AlR$_3$ wherein R is as defined above and (B) an organotitanium compound having

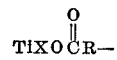

(R is as defined above and X is halogen) structure in the molecule.

2. A process as claimed in claim 1 wherein a halogen, a halogen compound or a mixture thereof is further included as a component of the catalyst.

3. A process as claimed in claim 1 wherein the atomic ratio of aluminum atom contained in the organoaluminum compound to titanium atom contained in the organotitanium compound is within a range from 1 to 200.

4. A process as claimed in claim 2 wherein the atomic compound to the halogen or halogen atom contained in the halogen compound is within a range from 0.01 to 20.

5. A process as claimed in claim 1 wherein the molar ratio of said diene to said α-olefin in the initial monomer composition is within a range from 10:1 to 1:100.

6. A process as claimed in claim 1 wherein said organoaluminum compound and said organotitanium compound are mixed at a temperature within a range from −100° C. to +100° C.

7. A process as claimed in claim 2 wherein said halogen, halogen compound or a mixture thereof is mixed with the other catalyst components at a temperature within a range from −100° C. to +100° C.

8. A process as claimed in claim 1 wherein polymerization reaction is carried out at a temperature within a range from −100° to +100° C.

9. A process as claimed in claim 8 wherein said temperature is within a range from −78° C. to +50° C.

10. A process as claimed in claim 3 wherein the molar ratio of said diene to said α-olefin in the initial monomer composition is within a range from 5:1 to 1:50, the atomic ratio of aluminum atom contained in the organoaluminum compound to titanium atom contained in the organotitanium compound is within a range from 2 to 100, said organoaluminum compound and said organotitanium compound are mixed at a temperature within a range from −78° to +50° C., and polymerization temperature is within a range from −78° C. to +50° C.

11. A process as claimed in claim 10 wherein the R used in the general formula to identify said α-olefin represents $C_1$–$C_6$ hydrocarbon radical, said conjugated diene is selected from the group consisting of isoprene and pentadiene-1,3 and the R used in the general formula to identify said organoaluminum compound represents $C_2$–$C_6$ hydrocarbon radical.

12. A process as claimed in claim 4 wherein the molar ratio of said diene to said α-olefin in the initial monomer composition is within a range from 5:1 to 1:50, the atomic ratio of aluminum atom contained in the organoaluminum compound to titanium contained in the organotitanium compound is within a range from 2 to 100, the atomic ratio of titanium atom contained in the organotitanium compound to the halogen or halogen atom contained in the halogen compound is within a range from 0.02 to 10, the catalyst components are mixed at a temperature within a range from −78° C. to +50° C. and polymerization reaction is carried out at a temperature within a range from −78° C. to +50° C.

13. A process as claimed in claim 12 wherein the R used in the general formula to identify said α-olefin represents a $C_1$–$C_6$ hydrocarbon radical, said conjugated diene is selected from the group consisting of isoprene and pentadiene-1,3 and the R used in the general formula to identify said organoaluminum compound represents a $C_2$–$C_6$ hydrocarbon radical.

14. A 1:1 copolymer of a $C_5$–$C_{12}$ conjugated diene and an α-olefin having alternating said conjugated diene and said α-olefin units, said α-olefin having the general formula of $CH_2=CHR$ wherein R represents a $C_1$–$C_{12}$ hydrocarbon radical selected from the group consisting of an alkyl, a cycloalkyl, an aryl and an aralkyl radical.

15. An alternating copolymer as claimed in claim 14 wherein said conjugated diene is isoprene.

16. An alternating copolymer as claimed in claim 15 characterized in that (a) the microstructure of said isoprene units in the copolymer is predominantly in 1,4-structure, (b) the configuration of said isoprene units having 1,4-structure is predominantly in cis-1,4-configuration and (c) 1,2-structure isoprene units are substantially absent from its infra-red spectrum and its nuclear magnetic resonance spectrum.

17. An alternating copolymer as claimed in claim 14 wherein said conjugated diene is pentadiene-1,3.

18. An alternating copolymer as claimed in claim 17 characterized in that (a) the microstructure of said pentadiene-1,3 units in the copolymer is predominantly in 1,4-structure, (b) the configuration of said pentadiene units having 1,4-structure is predominantly in trans-1,4-configuration and (c) 1,2-structure pentadiene units are substantially absent from its infra-red spectrum and its nuclear magnetic resonance spectrum.

19. A process for preparing a 1:1 copolymer of a $C_5$–$C_{12}$ conjugated diene and an α-olefin having alternating said conjugated diene and said α-olefin units, said α-olefin having the general formula of $CH_2=CHR$ wherein R represents a $C_1$–$C_{12}$ hydrocarbon radical selected from the group consisting of an alkyl, a cycloalkyl, an aryl and an aralkyl radical, which comprises contacting said conjugated diene and said α-olefin in liquid phase with a catalyst composed of (A) an organoaluminum compound having the general formula of $AlR_3$ wherein R is as defined above, (B) an organotitanium compound which reacts with a halogen, a halogen compound or a mixture thereof, which has

(R is as defined above) structure, and which is free of Ti—X linkage, wherein X is halogen, and (C) a halogen, a halogen compound or a mixture thereof.

References Cited

UNITED STATES PATENTS

| | | | |
|---|---|---|---|
| 3,590,024 | 6/1971 | Ishizuka et al. | 260—85.3 R |
| 3,652,518 | 3/1972 | Kawasaki et al. | 260—85.3 R |
| 3,652,519 | 3/1972 | Kawasaki et al. | 260—85.3 R |

FOREIGN PATENTS

| | | | |
|---|---|---|---|
| 1,010,790 | 11/1965 | Great Britain | 260—85.3 |
| 1,026,615 | 4/1966 | Great Britain | 260—85.3 |
| 1,108,630 | 3/1968 | Great Britain | 260—85.3 |
| 546,150 | 9/1956 | Belgium | 260—85.3 |

JOSEPH L. SCHOFER, Primary Examiner

A. HOLLER, Assistant Examiner

U.S. Cl. X.R.

260—85.3 R

UNITED STATES PATENT OFFICE
CERTIFICATE OF CORRECTION

Patent No. 3,737,417     Dated June 5, 1973

Inventor(s) KIYOSHIGE HAYASHI et al     Page 1 of 2

It is certified that error appears in the above-identified patent and that said Letters Patent are hereby corrected as shown below:

Column 4, line 18 - replace "triphentylaluminum" with
--tripentylaluminum-- .

Column 6, lines 37-38 - delete lines 37-38 and add:
--perature within a very wide range from -100°C to +100°C, and preferably from -78°C to +50°C.-- .

Table 1, footnote - replace "[1] Microstructure..." with -- [2] Microstructure...-- , and "[2] Measured..." with -- [1] Measured...-- .

Column 9, line 3, after "temperature", insert --bath-- .

Table 2, Exp. No. 1, third column, replace "$TiCl_3(OCOCH_3)$"
with --$TiCl_3(O\overset{O}{\overset{\|}{C}}CH_3)$-- .

Table 2, Exp. No. 11, third column, replace "$O[Ti(\overset{O}{\overset{\|}{O}CCH_3})_3]_2$"
with --$O[Ti(O\overset{O}{\overset{\|}{C}}CH_3)_3]_2$-- .

Table 2, footnote - replace "$Ti(Oi-Pr)_2(OCCH_3)_2$" with
--$Ti(Oi-Pr)_2(O\overset{O}{\overset{\|}{C}}CH_3)_2$--; and "$Ti(OCH(CH_3)CH_3]_2(OCCH_3)_2$"
with --$Ti[OCH(CH_3)CH_3]_2(O\overset{O}{\overset{\|}{C}}CH_3)_2$-- .

UNITED STATES PATENT OFFICE
CERTIFICATE OF CORRECTION

Patent No. 3,737,417  Dated  June 5, 1973

Inventor(s)  KIYOSHIGE HAYASHI et al  Page 2 of 2

It is certified that error appears in the above-identified patent and that said Letters Patent are hereby corrected as shown below:

Table 3, Exp. No. 7, fourth column - replace "20" with -- -20-- .

Column 10, last line - replace "10" with --1.0-- .

Column 11, line 5 - replace "an" with ---and--- .

Column 11, line 47 - replace "bottes" with --bottles-- .

Column 13, line 7 - replace "I" with --It-- .

Column 13, line 14 - replace "7.85$\gamma$" with --7.95$\gamma$-- .

Table 5, Example No. 1, last column - insert --0-- .

Table 5, fourth column - in all formulae, oxygen bond should be rewritten $--O\overset{O}{\underset{\|}{C}}--$, instead of "$O\overset{O}{C}$" .

Column 17, line 3 - after "the atomic", insert --ratio of titanium atom contained in the organotitanium-- .

Column 17, line 8 - replace "10.1" with --10:1-- .

Column 18, line 37 - replace "Ti$O\overset{R}{\underset{\|}{C}}R$" with --Ti$O\overset{O}{\underset{\|}{C}}R$-- .

Signed and sealed this 6th day of August 1974.

(SEAL)
Attest:

McCOY M. GIBSON, JR.
Attesting Officer

C. MARSHALL DANN
Commissioner of Patents